United States Patent [19]

Batzer et al.

[11] 4,051,027

[45] Sept. 27, 1977

[54] SETTLING CLAY-CONTAINING SLIMES

[75] Inventors: Othmer F. Batzer; John A. Stewart, both of Libertyville, Ill.

[73] Assignee: International Minerals & Chemical Corporation, Libertyville, Ill.

[21] Appl. No.: 643,446

[22] Filed: Dec. 22, 1975

[51] Int. Cl.$^2$ .............................................. C02B 1/20
[52] U.S. Cl. .................................. 210/42 R; 210/50; 210/63 R
[58] Field of Search ................. 209/5; 210/15, 18, 42, 210/50–54, 62, 63, 83; 423/319–321

[56] References Cited

U.S. PATENT DOCUMENTS

| | | | |
|---|---|---|---|
| 1,064,773 | 6/1913 | Richter | 210/45 |
| 2,576,442 | 11/1951 | Borglin et al. | 210/63 R |
| 2,968,528 | 1/1961 | Tuttle et al. | 210/54 A |
| 3,530,067 | 9/1970 | Friedman | 210/15 |
| 3,680,698 | 8/1972 | Liv et al. | 210/46 |
| 3,763,041 | 10/1973 | Cook et al. | 210/42 |
| 4,017,392 | 4/1977 | Hamer et al. | 210/54 |

OTHER PUBLICATIONS

Chem. Abstracts, 113710t, vol. 82, 1975.

*Primary Examiner*—Wilbur L. Bascomb, Jr.
*Assistant Examiner*—Peter A. Hruskoci
*Attorney, Agent, or Firm*—Robert H. Dewey; Howard E. Post

[57] ABSTRACT

The settling of finely-divided solids that are in suspension in an aqueous medium due to the presence of a colloidal argillaceous mineral is enhanced by adding a small but effective amount of hydrogen peroxide to the suspension. This invention is especially useful for treating aqueous suspensions of ultrafine clay and other materials resulting from the hydraulic concentration of an ore material, such as phosphate slimes.

5 Claims, No Drawings

SETTLING CLAY-CONTAINING SLIMES

BACKGROUND OF THE INVENTION

This invention relates to a process for separating finely-divided solids that are suspended in an aqueous medium and, more particularly, to a process for treating a colloidal suspension of clay, alone or in combination with other solid materials, to enhance the settling of the solids.

Clays having a micaceous or platey structure such as bentonite (a montmorillonite clay) acquire the properties of self-suspension, swelling and gelatinizing when they are mixed with water. The clays are advantageously used for these unique properties in many industries. An example of such a beneficial use is in the well drilling industry where bentonite is a component of drilling fluids to suspend the cuttings and carry them out of the well bore.

These same properties of some clays present considerable problems in other industries when it is desired to remove the clays and other materials from suspension in an aqueous medium. For example, many foundries use a sand washing operation that produces as an undesirable by-product a wash water containing on the order of about 0.2 to about 1.2% by weight of suspended bentonite, carbonaceous material and fine sand. The disposal of this waste product has become a problem in view of recent stringent pollution regulations. The use of standard filtering methods and apparatus for separating the finely-divided material from the waste water before discharging or recycling the water is not entirely satisfactory since the fine suspended particles rapidly blind the filter media.

The colloidal behavior of certain clays upon exposure to water presents a very serious problem when hydraulic methods are employed to effect concentration of ore materials containing the clays. These operations, as exemplified by phosphate ore beneficiation processes used in Florida, produce tremendous volumes of aqueous suspensions of ultrafine material that are extremely difficult to de-water. These suspensions are commonly called "slimes". These slimes, which are encountered by metallurgists and mineralogists, are entirely different from the slimes formed by certain microorganisms or fungi such as Myxomycetes slime molds so that treatments for destroying the latter slimes have no application in solving the "slime problem" encountered in the mineral industry.

Mining of phosphate ore in Central Florida is done by an open-pit method. The practice is to strip the overburden to expose the phosphate ore, called the "matrix", for mining. The thickness of the matrix ranges from one to fifty feet, and it is typically composed of about ⅓ phosphate, ⅓ silica sand and ⅓ clay. The matrix is mined with electric-powered walking draglines and the mined ore is hydraulically conveyed from the mining site to the beneficiation plant. In the typical phosphate beneficiation process, the matrix is initially sized and washed to produce a −¾ inch +16 mesh (Tyler Standard Series) pebble product. The −16 mesh material is then subjected to a desliming operation to remove substantially all of the −150 mesh waste material prior to the beneficiation of the −16+150 mesh material.

The suspension of the −150 mesh waste slime material is continuously transferred to a settling pond built in a mined-out area. The solids slowly settle to produce an upper layer of clarified water that is recycled to the plant for further use, until the settled slimes reach the top of the dam. The mineralogical composition of the slime solids will vary depending upon the location where the matrix was mined. The occurrence of specific minerals in phosphate slimes is somewhat consistent, but the relative amounts of the components vary considerably depending upon the manner in which the sedimentary phosphate rock deposits were formed. Montmorillonite and attapulgite are present in Florida phosphate slimes along with other materials such as fluorapatite, quartz, fluorspar and heavy minerals. The montmorillonite and attapulgite, which are well known for their colloid-like behavior in water, cause the characteristically slow settling property of the slimes.

It is necessary to continuously replace filled dams with newly-constructed ones in view of the slow settling property of the slimes. Slimes that are transferred to a dam or impounding area from a beneficiation plant may contain as little as about 1.5 to 3% solids. The solids content is increased to only about 15% after three months of settling, and from that time on further densification is extremely slow. A state of equilibrium of only about 25% solids is reached after several years of storage. Therefore, the water content of settled slimes is so great that the storage volume required for the slimes is greater than the volume of the matrix that was removed.

The volume of a quantity of slimes does not appreciably decrease even after many years of storage. Evaporation over a number of years forms a thin crust of material containing about 20% water on the surface of the slimes. At this level of moisture, the crust is virtually impervious to the transfer of moisture so that further evaporation from under the crust does not take place. The slime solids cause the formation of an impervious layer that prevents seepage of water through the dams and the bottom of the impounding area. It has been estimated that there are over 1.5 billion tons of phosphate slime solids being stored in dams in Florida.

Considerable effort has been expended to find an economic and efficient method for bringing about the complete and rapid settling of the extremely fine solid materials. A solution to this problem would be of significant benefit since there are phosphate values in the slimes that could be recovered, substantial areas of land are used for storing the slimes, and the storage of the slimes poses an environmental problem. Also, the quantity of water associated with the stored slime solids, which is estimated to be about 4.5 billion tons, has increasing importance since the availability of water in the Central Florida area is becoming more restricted.

Although considerable research has been conducted by the industry, as well as governmental and other organizations, to find a suitable method for de-watering slimes, no completely satisfactory solution has yet been found. The various methods that were considered include conventional filtration, pressure filtration, hydrocycloning, centrifugation, electrical methods such as electrophoretic and electroosmotic methods, and the addition of various chemicals such as flocculants and dispersants to modify the properties of the clay.

Reagents which are known to be flocculants for other systems do not to any significant degree bring about the accelerated settling of slime solids. A report on the evaluation of a variety of flocculating reagents is given in the *Bureau of Mines Report of Investigations* 6163 entitled "CHEMICAL AND PHYSICAL BENEFICIATION OF FLORIDA PHOSPHATE SLIMES", published in 1963. None of the reagents evaluated were particularly effective in improving the rate of settling of the slimes, and the maximum settling over a 24-hour period was obtained by using 18 to 140 pounds of citric acid per ton of solids. The most rapid initial settling was obtained in 10 minutes with certain high molecular weight polymers, but after 24 hours the settled value was less than that obtained when citric acid was used.

SUMMARY OF THE INVENTION

This invention is based on the discovery of a process for treating an aqueous suspension of finely-divided material including colloidal argillaceous minerals to accelerate the settling of the solids. In accordance with this invention, the rapid settling of the solids in suspension is brought about by the addition of a small but effective amount of hydrogen peroxide to the suspension. The process of this invention has a variety of applications in industry, but it is especially useful for settling solids from slimes resulting from a hydraulic treatment of clay-containing ores.

It is, therefore, a primary object of this invention to provide a process for treating aqueous suspensions of finely-divided solids including clays that exhibit colloidal behavior in water.

Another object of this invention is to provide a process for accelerating the settling of finely-divided material including colloidal argillaceous minerals from an aqueous suspension thereof.

Still another object of this invention is to provide a process for accelerating the rate of settling of the solid content of slimes resulting from the hydraulic treatment of ore materials.

A further object of this invention is to provide a process for treating phosphate slimes to accomplish the rapid settling of the solid content thereof.

A still further object of this invention is to provide a process using hydrogen peroxide for treating phosphate slimes.

These and further objects of this invention will become apparent or be described as the description thereof herein proceeds.

DESCRIPTION OF THE PREFERRED EMBODIMENTS

The aqueous suspensions that can be treated in accordance with this invention to accelerate the settling of the finely-divided content thereof generally include those suspensions that result from the presence of clay exhibiting colloidal behavior in water. Attapulgite and montmorillonites are among the types of clays that possess the properties of self-suspension, swelling and gelatinizing in water so as to become suspended in water along with other finely-divided material that might be present. Although the method of this invention has a variety of applications in industry such as for treating wash water from a foundry sand recovery process as hereinabove described, it perhaps has its greatest utility in treating the aqueous suspensions, commonly called "slimes", resulting from hydraulically concentrating an ore material containing a clay of the type described above. This invention is particularly useful for treating phosphate slimes resulting from the hydraulic treatment of phosphate ore such as currently being used in Florida.

The percentage of solids in suspensions which respond to treatment by the present invention is not critical. Desirable results may be obtained over a wide range of solids content. The method of this invention will generally be used when the solids content is as low as about 0.01% or high as about 35% by weight, most commonly from about 1% to about 10% by weight, but it is also useful for treating suspensions having lower and higher solids contents.

The place, time and method of adding the hydrogen peroxide are not critical and this flexibility is one of the advantages of this invention. For example, the settling agents of this invention may be continuously added to slimes as they are introduced into the impounding areas, or the settling agents may be added to an inactive impounding area. The only requirement is that the hydrogen peroxide be sufficiently distributed among the suspension being treated to accomplish the settling.

The amount of hydrogen peroxide utilized in accordance with this invention is the quantity that is necessary to produce the desired degree and rate of settling of the slime solids. There will be incomplete settling of the slime solids if less than an optimum quantity of a settling agent is used. On the other hand, there will be no advantage in using quantities of hydrogen peroxide in excess of the optimum quantity. The proper amount of the settling agent to achieve the desired result will be readily ascertainable by one skilled in the art. This will depend upon the composition of the specific volume of slimes being treated, including the total quantity of solids in suspension, the age of the suspension, the percentage of clay in the suspension, the relative amounts of the different suspended solids, and the like. The composition of the slimes will vary in any general area, depending upon the specific area being mined. Hydrogen peroxide will generally be employed in amounts ranging from about two pounds to about forty pounds per ton of suspended mineral solids.

The hydrogen peroxide is added to the slimes in an aqueous solution, but the concentration of the hydrogen peroxide is not critical. However, it is most advantageously added to the slimes in aqueous solutions containing from about 30% to 70% hydrogen peroxide. Solutions of lesser concentrations may also be used, but the use of a relatively dilute solution would have the disadvantage of using excessive quantities of water. The hydrogen peroxide may also be generated at the point of treatment by using an ozone generator with moist air as the feed to the ozone generator. The ozone will react with the moisture content of the air to produce hydrogen peroxide in the discharge stream from the ozone generator, which can be applied directly to the slimes. The amount of hydrogen peroxide formed will be dependent on variables such as the moisture content of the air, the voltage used and the rate of flow of the air. Experiments have demonstrated that ozone by itself will not produce the desired results.

The following non-limiting examples are illustrative of the present invention.

EXAMPLE I

This example illustrates the effect of the process of this invention for flocculating and settling finely-divided material from an aqueous suspension as hereinabove described. The suspension which was utilized in this experiment was a sample of phosphate slimes containing about 4% by weight of suspended solids. Samples of 100 milliliters each of the slime were added to 5 granduated cylinders. A 30% solution of hydrogen peroxide was added to four of the samples in the amounts of 0.025, 0.05, 0.1, and 0.2 milliliter, respectively. No hydrogen peroxide was added to the fifth sample since it was used as a control. The graduated cylinders were each inverted several times to allow thorough mixing and the volume of clear water at the upper portion of each sample was observed and recorded over a 24-hour period. The results of this experiment are given in Table 1.

Table 1

| TIME (hours) | 0 (mls.) | 0.025 (mls.) | 0.05 (mls.) | 0.1 (mls.) | 0.2 (mls.) |
| --- | --- | --- | --- | --- | --- |
| 1.0 | 6 | 4 | 4 | 20 | 21 |
| 1.5 | 8 | 4 | 26 | 26 | 28 |
| 2.0 | 10 | 10 | 30 | 30 | 31 |
| 2.5 | 11 | 24 | 30 | 31 | 31 |
| 3.0 | 12 | 24 | 30 | 34 | 34 |
| 4.0 | 14 | 24 | 30 | 34 | 36 |
| 5.0 | 16 | 24 | 30 | 36 | 42 |
| 6.0 | 18 | 26 | 30 | 36 | 42 |
| 7.0 | 20 | 28 | 30 | 38 | 42 |
| 24.0 | 25 | 32 | 40 | 43 | 45 |

It will be noted from Table 1 that the volume of clear water at the top of the control sample was only 25 milliliters at the end of 24 hours. The volumes of clear water in the samples to which 0.05, 0.1 and 0.2 milliliter of the hydrogen peroxide solution were added were greater after 1½ hours of standing than achieved by the control sample in 24 hours. The rate of settling was slower for the sample to which only 0.025 milliliter of the hydrogen peroxide solution was added, but it achieved almost the degree of settling in 2½ hours that was achieved in the control sample in 24 hours. In all instances of the treated samples, the volumes of clear water were substantially greater after 24 hours than in the control sample, with the volume increasing as the quantity of added hydrogen peroxide was increased.

EXAMPLE II

An attempt was made to repeat the experiment of Example I except that inorganic peroxides were used. The inorganic peroxides that were used in this experiment were sodium peroxide, calcium peroxide and zinc peroxide. The addition of the inorganic peroxides did not result in an improvement in the degree or rate of the settling of the solids content of the suspension.

Although this invention has been described in relation to the specific embodiments, it will be apparent to one skilled in the art that obvious modifications may be made without departing from the intended scope of the invention as defined by the appended claims.

What is claimed is:

1. A process for settling waste slime solids, from a phosphate are processing operation, including suspended attapulgite, montmorillonite, and fine sand from an aqueous suspension thereof, wherein said suspension contains from about 0.01% to about 35% by weight of solids, which comprises the steps of adding hydrogen peroxide to said suspension in an amount to enhance the settling of said solids, said amount being at least about 2 pounds per ton of suspended solids, and settling said solids from said suspension.

2. A process in accordance with claim 1 wherein said suspension contains from about 0.2 to about 1.2% by weight of suspended bentonite.

3. A process in accordance with claim 1 wherein hydrogen peroxide is added in an amount ranging from about 2 pounds to about 40 pounds per ton of suspended solids.

4. A process in accordance with claim 3 wherein 30% to 70% aqueous solution of hydrogen peroxide is added to said waste slimes.

5. A process in accordance with claim 4 wherein said suspended solids are substantially all −150 mesh material.

* * * * *

UNITED STATES PATENT AND TRADEMARK OFFICE
CERTIFICATE OF CORRECTION

PATENT NO. : 4,051,027

DATED : September 27, 1977

INVENTOR(S) : Othmer F. Batzer and John A. Stewart

It is certified that error appears in the above-identified patent and that said Letters Patent are hereby corrected as shown below:

Column 4, line 66, "granduated" should read -- graduated --

Column 6, line 17, Claim 1, "are" should read -- ore --

Signed and Sealed this

Sixteenth Day of May 1978

[SEAL]

Attest:

RUTH C. MASON
Attesting Officer

LUTRELLE F. PARKER
Acting Commissioner of Patents and Trademarks